United States Patent [19]

Dehrmann

[11] Patent Number: 5,799,763
[45] Date of Patent: Sep. 1, 1998

[54] LOCK-UP CLUTCH OF A HYDRODYNAMIC TORQUE CONVERTER

[75] Inventor: Uwe Dehrmann, Wurzburg, Germany

[73] Assignee: Fichtel & Sachs AG, Schweinfurt, Germany

[21] Appl. No.: 725,361

[22] Filed: Oct. 3, 1996

[30] Foreign Application Priority Data

Oct. 4, 1995 [DE] Germany ............ 195 36 954.8
Jun. 5, 1996 [DE] Germany ............ 196 22 593.0

[51] Int. Cl.$^6$ .......... F16H 45/02; F16D 13/72; F16D 25/635; F16D 25/64
[52] U.S. Cl. .......... 192/3.29; 192/70.12; 192/70.14; 192/107 C; 192/113.35; 192/113.36
[58] Field of Search ............ 192/3.28, 3.29, 192/3.3, 52.2, 52.3, 52.4, 70.12, 70.14, 70.16, 107 C, 113.35, 113.36

[56] References Cited

U.S. PATENT DOCUMENTS

| | | | |
|---|---|---|---|
| 2,058,655 | 10/1936 | Anderson | 192/52.3 X |
| 2,135,126 | 11/1938 | Harwood | 192/52.3 X |
| 3,907,073 | 9/1975 | Harrison | 192/113.36 X |
| 4,469,206 | 9/1984 | Motomura et al. | |
| 5,056,631 | 10/1991 | Macdonald | 192/113.36 X |
| 5,184,704 | 2/1993 | Hays | 192/70.14 |
| 5,383,540 | 1/1995 | Macdonald | 192/3.3 X |
| 5,501,309 | 3/1996 | Walth et al. | 192/3.29 |
| 5,566,802 | 10/1996 | Kirkwood | 192/70.14 X |
| 5,667,043 | 9/1997 | Dehrmann et al. | 192/113.36 X |
| 5,669,474 | 9/1997 | Dehrmann et al. | 192/3.29 |

FOREIGN PATENT DOCUMENTS

| | | |
|---|---|---|
| 4425912 | 2/1995 | Germany . |
| 4407727 | 9/1995 | Germany . |
| 0955066 | 4/1964 | United Kingdom . |
| 2285851 | 7/1995 | United Kingdom . |

Primary Examiner—Rodney H. Bonck
Attorney, Agent, or Firm—Nils H. Ljungman & Associates

[57] ABSTRACT

A lock-up clutch for a hydrodynamic torque converter which includes at least one piston which can be displaced in the axial direction and can be connected to the converter housing by means of at least one friction zone, which piston defines, by means of the side which faces the converter housing, a chamber in which, when the lock-up clutch is active, the pressure is lower than the pressure in the converter circuit, and which, in the vicinity of a friction zone, has at least one channel for the flow of hydraulic fluid from the converter circuit. The quantitative flow of hydraulic fluid is a function of the pressure exerted by the converter. The lock-up clutch further includes at least one friction zone which has at least one friction lining, whereby the lock-up clutch has a total of at least two friction linings of different axial dimensions which, in the event of different pressures acting in the converter, come into at least partial effective connection with the matching friction surfaces.

24 Claims, 7 Drawing Sheets

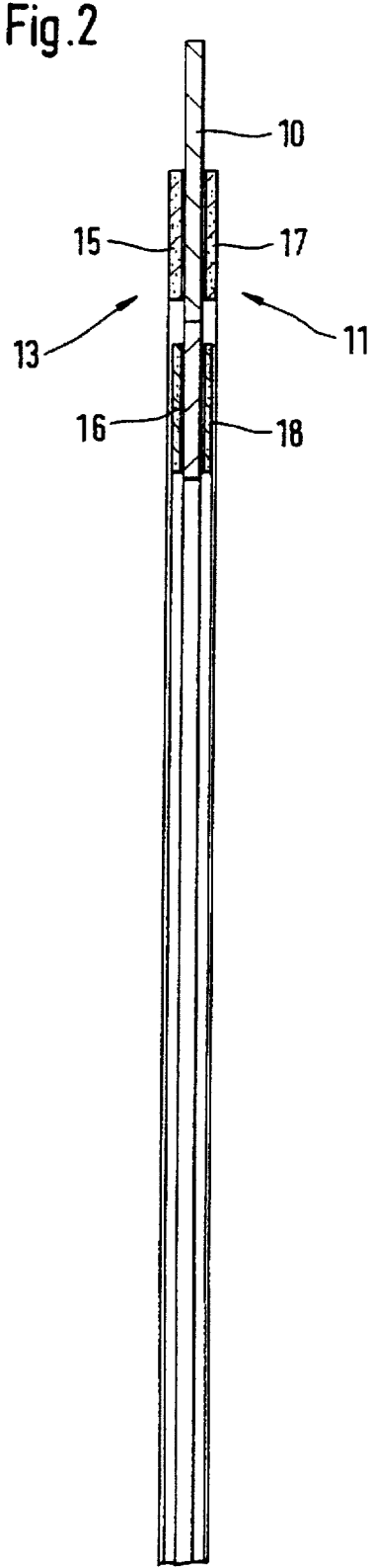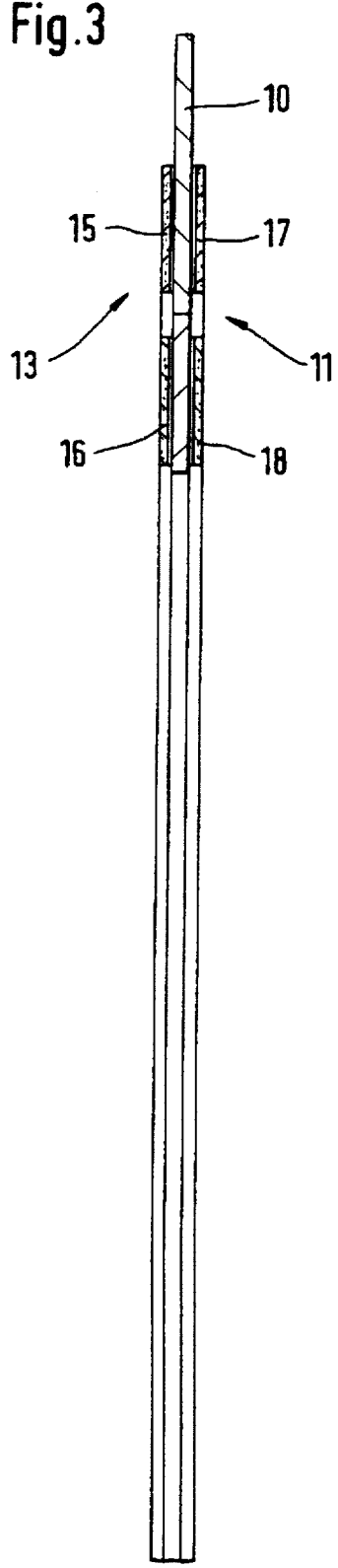

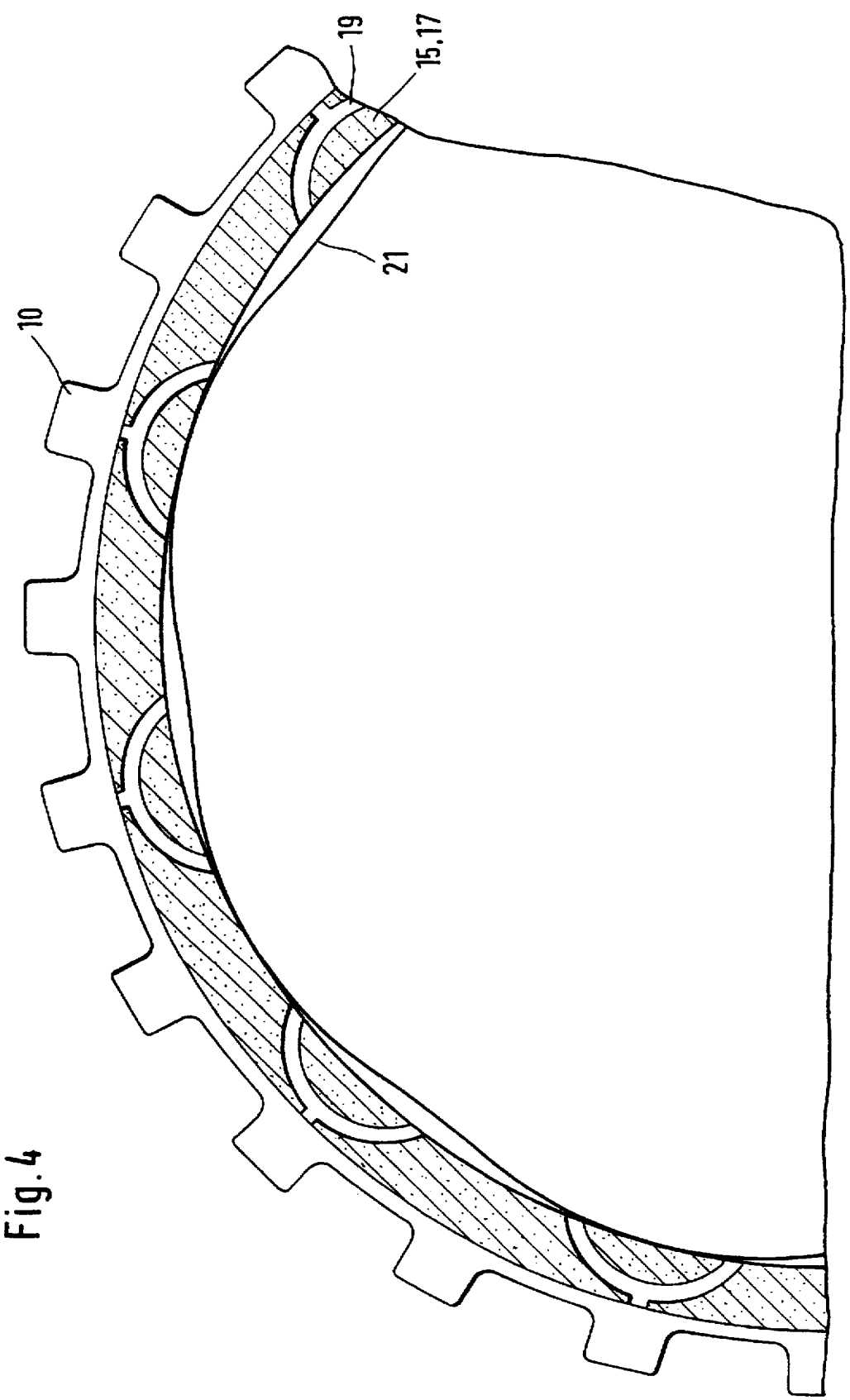

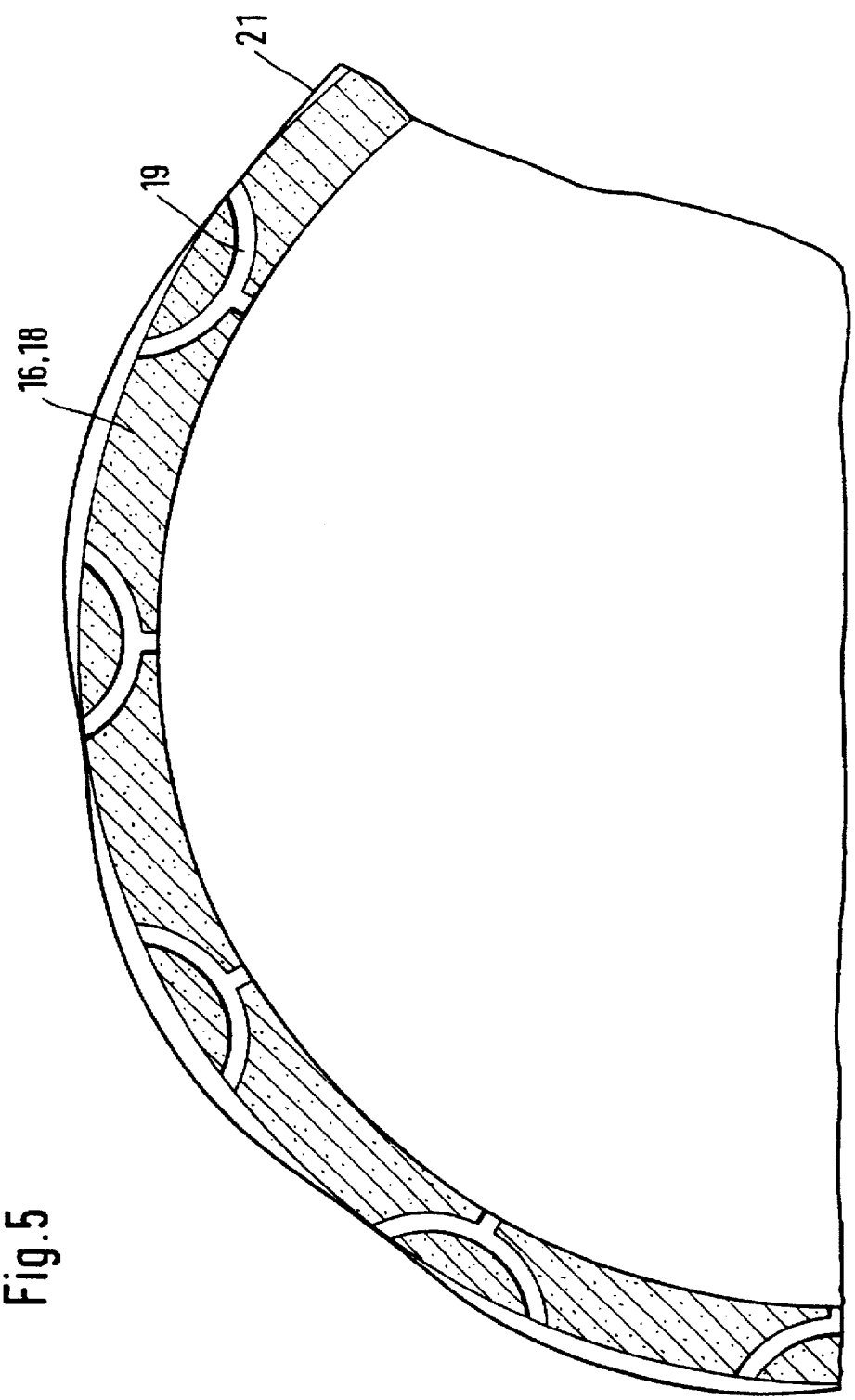

Fig. 9
Fig. 10
Fig. 11
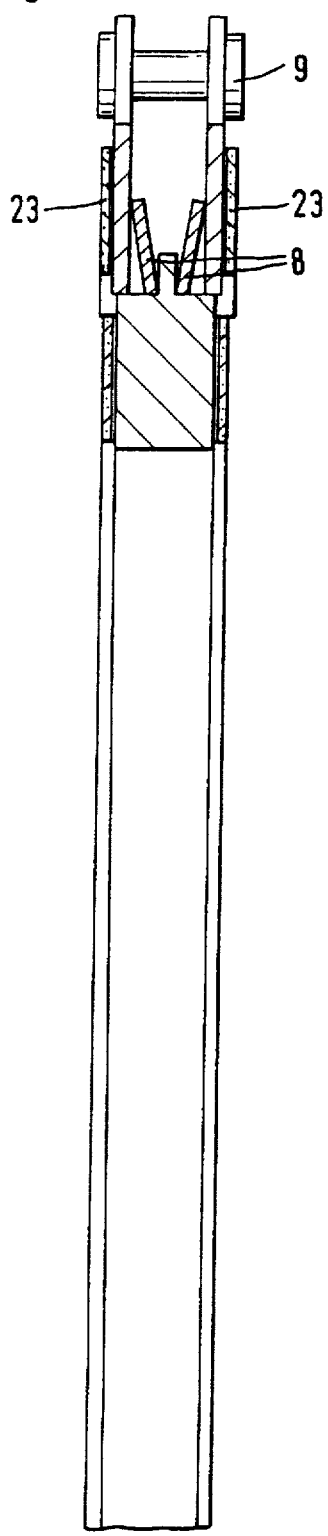
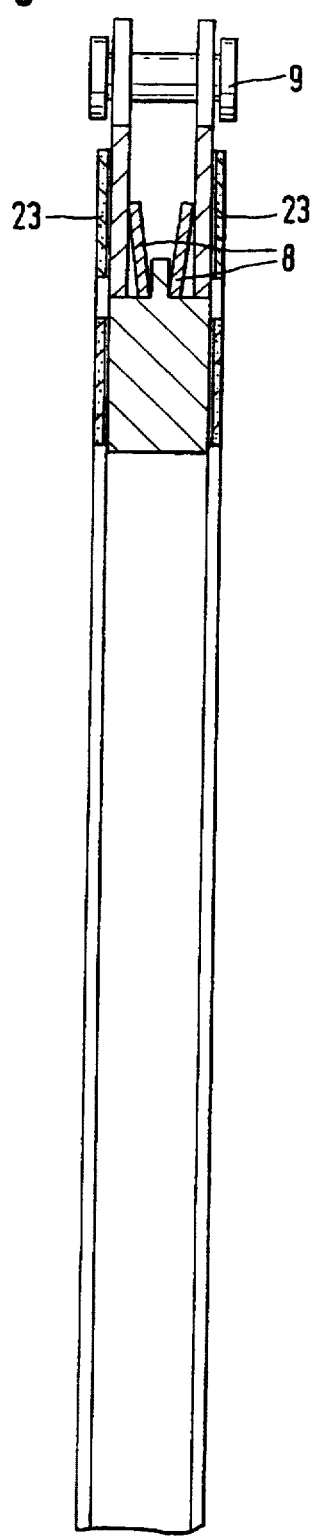
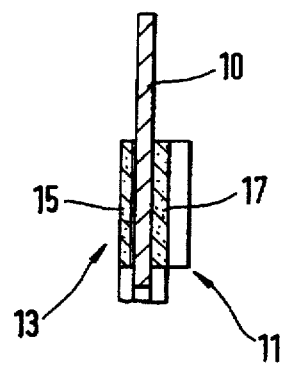

LOCK-UP CLUTCH OF A HYDRODYNAMIC TORQUE CONVERTER

BACKGROUND OF THE INVENTION

1. Field of the Invention

The present invention relates to a hydrodynamic torque converter.

2. Background Information

German Patent No. 44 25 912 A1 relates to a hydrodynamic torque converter with a lock-up clutch which can be engaged by means of an elastically deformable piston which is located in the vicinity of the friction surface. The lock-up clutch functions as follows: to transmit low torques, the piston is pressed with a relatively low pressure toward the converter housing, whereby a portion of the friction surface of the elastically deformable piston is effectively connected to the converter housing by a low surface pressure. Some slip occurs, which generates a significant amount of heat. To remove this heat, oil is transported through the radial channels which have been realized in the components which carry the friction surface. These channels become narrower in the radially inward direction. As the pressure from the converter increases, both the elastic deformation of the piston and the surface pressure of the contact surfaces increase. As a result of the elastic deformation, the proportion of the friction surface in contact also increases, whereby, because the channels taper in the radially inward direction, the flow cross sections of the channels are reduced. The quantitative flow of hydraulic fluid is thereby reduced as a function of the amount of the friction surface which is in contact. As the pressure applied by the converter increases, the surface pressure of the friction surface also increases, as a result of which the slip and the heat thereby generated decrease.

One problem of similar devices, at low pressure in particular, is that the thermal losses generated during the clutching process occur on the small portion of the friction surface by means of which the clutch is connected. Consequently, there is a danger that the connected friction surface will overheat, which may result in the destruction of the friction surface.

In addition, when the torques to be transmitted are very low and very high, the friction surface only comes into partial contact, which results in uneven wear of the friction surface. Depending on the instantaneous shape of the surface of the friction surface, which results from the individual use of the clutch, each clutch has individual characteristics. Since, for safety reasons, the driver needs to be able to calculate the clutch characteristics, that reduces the useful life of the lock-up clutch.

OBJECT OF THE INVENTION

One object of the present invention is the provision of an improved lock-up clutch on a hydrodynamic torque converter, so that it is easily and economically possible to adapt the flow of the coolant coming from the converter circuit to the current coolant requirement, while achieving a long useful life of the lock-up clutch.

SUMMARY OF THE INVENTION

The invention teaches that this object can be accomplished as discussed below.

As a result of the measure whereby a friction zone is realized so that both the amount of coolant flow and the absolute area of the friction zone which is effectively connected to the matching friction surface can be controlled by the pressure exerted by the converter, a hydrodynamic torque converter with higher efficiency is created. When the torques to be transmitted are low, a low pressure from the converter is exerted on the piston. As a result, only the portion of the friction zone is in contact with the matching friction area which is at the smallest axial distance from the matching friction surface in the no-load status of the converter. The channels in this area of the friction zone are designed so that the flow of hydraulic fluid required for cooling is guaranteed. The coolant flow builds up a pressure which counteracts the application pressure, but in this pressure range, in spite of the lifting losses which occur on the piston, this counter pressure is acceptable, because the application pressure on the piston can be increased at any time.

As the application pressure increases, the transmission capability increases on one hand as a result of greater surface pressure, and on the other hand as a result of an increase in the area of the friction zone which is effectively connected, whereby the slip and the amount of heat generated are reduced.

There is additionally disclosed one advantageous embodiment of a friction zone, wherein the friction zone consists of a plurality of radially-oriented friction linings which can be connected. In another embodiment, the friction linings have friction zones of different axial dimensions, whereby a graduation of the area of the friction surface which can be placed in effective connection can be achieved as a function of the pressure exerted by the converter. In yet another embodiment, the friction linings with different axial dimensions have different elasticities. In one particularly advantageous arrangement, the friction linings which have the greatest axial dimension have the highest elasticity. The friction linings with the greatest axial dimension come into effective contact with the matching friction surface first. As the application pressure increases, their axial dimension is reduced, and the number of friction linings in effective contact is increased. These friction linings which now enter into effective contact can have a lower elasticity. The friction linings come into graduated contact. In another advantageous refinement, the effect achieved by the use of friction linings with different elasticities is achieved or enhanced by the arrangement of at least one friction lining on a cushioned component. This cushioning can be achieved particularly easily by using an annular spring. The operating range of the spring can be achieved by setting its maximum axial excursion, for which purpose a safety element may be provided.

There is also described an advantageous path for the grooves. The grooves may extend over the entire friction zone, as a result of which the hydraulic fluid flows through the entire friction zone. The flow cross section of the channels can be reduced in the elastic friction linings as the application pressure increases, or the friction linings which enter into effective contact with the matching friction surface at a higher application pressure can be provided with channels which have a small cross section. As a result, it becomes possible to reduce the flow of coolant as the application pressure increases.

It is also possible to reduce the flow of hydraulic fluid through the friction zone by the appropriate configuration of a system of channels. If, for example, the hydraulic fluid inside the friction zone or inside the friction lining is reversed so that it flows opposite to the direction of flow imposed by the converter, the flow velocity is thereby reduced.

Additionally, the friction linings can be connected to one another. But it is also possible to positively connect the friction linings.

The invention teaches that it is advantageous to specify an oriented installation position for the friction linings which are located next to one another and have a common groove pattern by providing them with a polygon shape at the point where the friction linings are connected. As a result of the polygon-shaped friction linings which are positively connected to one another, the position of the friction linings with respect to one another is fixed.

Further, the path of the friction surfaces of the friction linings can be preferably parallel to the matching friction surfaces. The load is thereby applied evenly over the surface, and it is possible to achieve almost uniform wear of the individual friction linings, which is advantageous in terms of prolonging the useful life of the friction linings and thus of the lock-up clutch.

In a friction zone which has a plurality of friction linings located next to one another, it is possible that first the radially inside friction lining or the radially outside friction lining comes into effective contact with the matching friction surface. The invention teaches that it is advantageous, however, to have the radially outer friction lining come into effective contact first, because a stronger coupling action is achieved by the larger average radius of the friction lining.

The lock-up clutch can additionally have at least two friction linings. As disclosed herein, the friction linings come into effective contact simultaneously, each with a respective matching surface corresponding to the individual friction lining. These two friction linings thereby have different elasticities. As the pressure exerted by the converter increases, the friction lining with the higher elasticity is compressed in the axial direction, as a result of which the cross section of the channels realized in this friction lining is reduced.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below and is illustrated in the accompanying drawings, wherein:

FIG. 2 is an enlarged cross sectional view of a plate having friction zones consisting of two friction linings located respectively on the two sides of the plate, in the unpressurized status, as illustrated in FIG. 1;

FIG. 3 is the same as FIG. 2, but in the pressurized status;

FIG. 4 is a plan view of an outer friction lining of a friction zone with a polygon-shaped radial inside;

FIG. 5 is a plan view of an inner friction lining of the friction zone with polygon-shaped radial outside;

FIG. 9 is the same as FIG. 7, but is cushioned on both sides, in the unpressurized operating condition;

FIG. 10 is the same as FIG. 9, cushioned on both sides, in the pressurized operating condition; and FIG. 11 illustrates a lock-up clutch with a plate provided on the two sides thereof with friction surfaces of different elasticities.

DESCRIPTION OF THE PREFERRED EMBODIMENT

Figure 1:
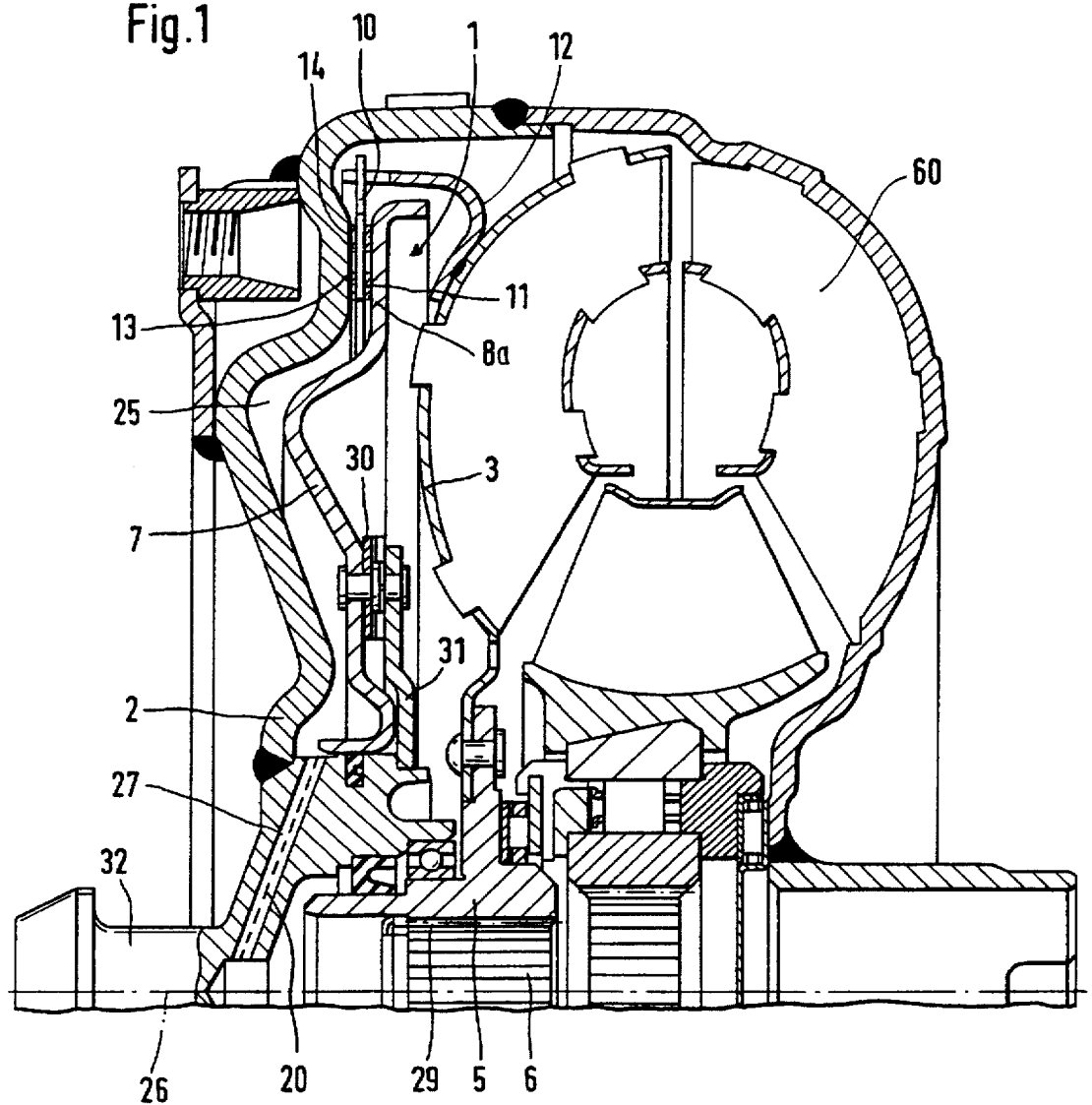
FIG. 1 is a cross sectional view of the upper half of a lock-up clutch for a hydrodynamic torque converter which has a plurality of friction zones and which includes a device for cooling.

The basic structure of a lock-up clutch of a hydrodynamic torque converter is explained in FIG. 1. The lock-up clutch 1 interacts with a converter housing 2, only a portion of which is shown, and which is fastened to the crankshaft of an internal combustion engine and is rotationally driven thereby. Located in the converter housing 2 and at some axial distance from it is a turbine wheel 3 which is fastened to a turbine hub 5, which is fitted non-rotationally to an output shaft 6.

The converter housing 2 includes a pump wheel 60 that is mounted inside of the converter housing 2 and rotates therewith. A pin member 32 can be provided for positioning the torque converter housing 2.

Figure 6:
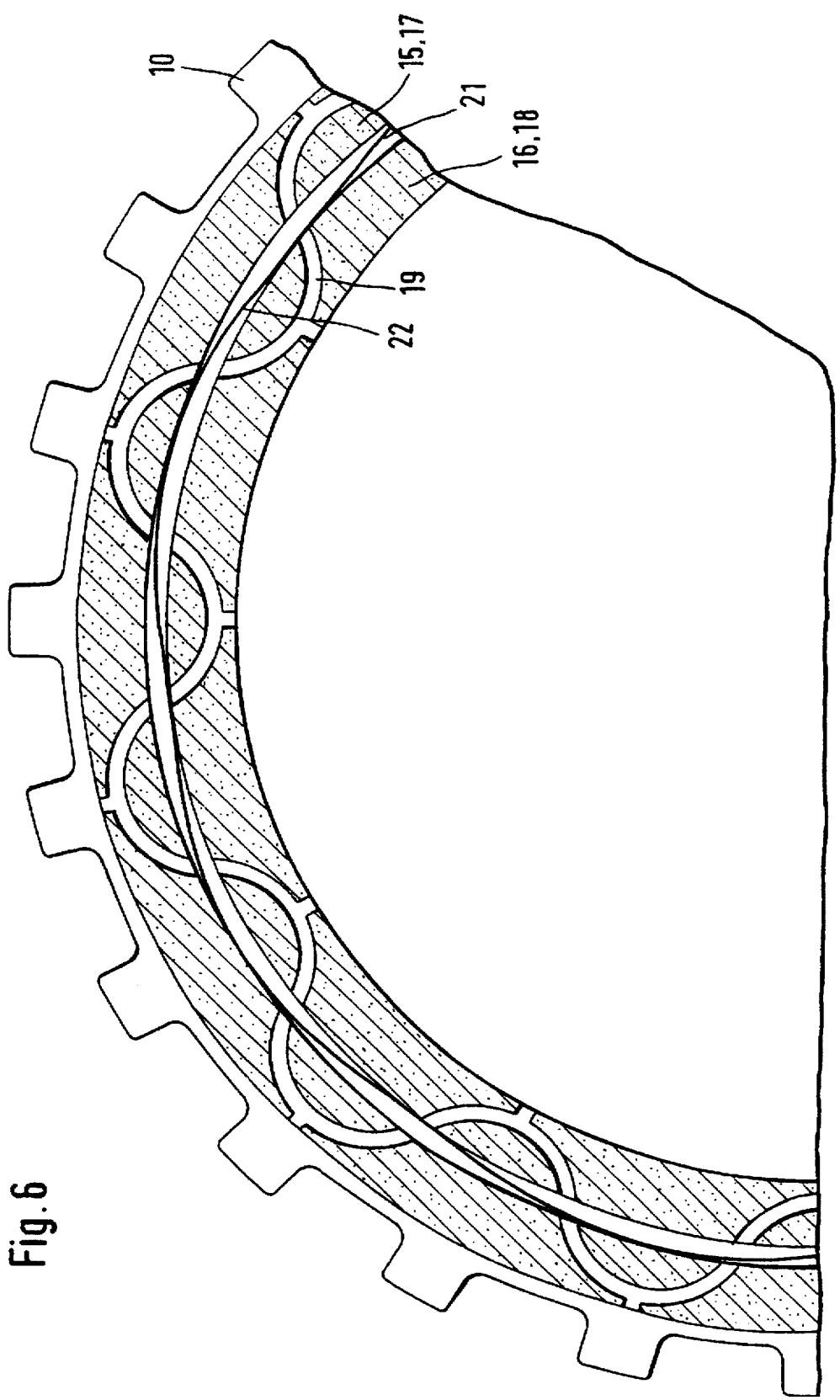
FIG. 6 is a plan view of a friction zone located on the plate, whereby the inner and outer friction linings are positively connected.

The lock-up clutch 1 has a piston 7 which is non-rotationally connected to the converter housing 2 in the radially inner area by means of a spring 30 with a housing 31, and can be displaced in the axial direction to a limited extent out of an idle position. The piston 7 is provided with a flat area 8a which lies on the radial outside, and which can be brought into contact with a friction zone 11 fastened to a plate 10. This friction zone 11 consists of two friction linings 17, 18 (shown in more detail, e.g., in FIGS. 2–6) which preferably have different axial dimensions (or thicknesses), whereby the friction lining 17 with the greater axial dimension is preferably located on the radial outside. The plate 10 is fastened by means of a clamp 12 to the turbine wheel 3, but is connected so that it can move axially with respect to the turbine wheel 3. On its side facing away from the friction zone 11, the plate 10 has an additional friction zone 13. This friction zone 13 consists of two friction linings 15, 16 (seen in more detail, e.g., in FIGS. 2–6) which preferably have different axial dimensions, whereby the friction lining 15 with the greater axial dimension is preferably located on the radial outside. This friction zone 13 comes into effective contact with a matching friction surface 14 of the converter housing 2. These friction linings 15, 16, 17, 18 located on the plate 10 are preferably provided with channels in the form of grooves 19, as illustrated in FIGS. 4–6.

The path of the grooves 19 in the friction linings is laid out so that a chamber 25 (shown in FIG. 1), which is defined on one side by the converter housing 2 and on the other side by the piston 7, can be reached through these grooves by the oil (or other hydraulic fluids) which originates from the interior chamber of the converter. Radially inside the chamber 25, between the turbine hub 5 and the converter housing 2, there is a boring 27. By means of this boring 27, the oil which flows radially inward into the chamber 25 can get into the center of the torque converter, from where it can be pumped out by means of a central boring 26 in the output shaft 6 into a reservoir for oil (e.g., hydraulic fluid).

At this point, a brief description of the function of the lockup clutch 1 is appropriate. The converter housing 2 uses the torque which is generated by the internal combustion engine to drive a pump (e.g., pump wheel 60) which, by means of a hydraulic medium, preferably oil, causes the turbine wheel 3 to revolve. The turbine wheel 3, by means of the turbine hub 5, transmits this rotational motion by means of a gearing (or splined fitting) 29, by means of which the turbine hub 5 is engaged with the output shaft 6, to the output shaft 6, which is connected in a manner not shown with a transmission. In this type of operation, there is always some slip between the pump wheel 60 of the torque converter and the turbine wheel 3. To eliminate this slip under certain operating conditions, there is provided a lock-up clutch 1 which, when the piston 7 is pressurized from the turbine wheel side, causes the piston 7 to be held in an effective connection with the converter housing 2 by means of the friction zones 11 and 13 provided on the plate 10. As a result, the torque is transmitted directly from the converter housing 2 and from the piston 7 by means of the corresponding friction zones 11 and 13 respectively to the plate 10, and from the plate 10 by means of the clamp 12 to the turbine wheel 3, from where it is transmitted by means of the gearing 29 of the turbine hub 5 to the output shaft 6. The hydraulic transmission path is thereby closed by the lock-up clutch 1, and no further slip takes place. To interrupt the connection between the piston 7 and the converter housing 2, the side of the piston 7 facing the converter housing 2 is pressurized with hydraulic fluid by means of a corresponding supply line 20, as a result of which the piston 7 is moved away from the converter housing 2 and the plate 10 provided with the friction zones 11 and 13 is thereby depressurized (or unclamped). The torque transmission to the friction zones 11 and 13 and via the plate 10 and the clamp 12 to the turbine wheel 3 thereby ends.

When the lock-up clutch 1 is functioning, and when the side of the piston 7 facing the converter housing 2 is pressurized, as a result of the buildup of a controlled slip for torsional damping, there can be a relative rotational movement of the converter housing 2 and of the piston 7 with respect to the plate 10 and thus with respect to the friction linings 15–18 of the friction zones 11 and 13. On account of this slip, the friction linings of friction zones 11 and 13 which are effectively connected to one another and the corresponding converter components, such as the piston 7 and the converter housing 2, will heat up. For this reason, there are preferably provided grooves 19 (shown in FIGS. 4–6) to carry a flow of coolant (e.g., hydraulic fluid or oil) in the friction linings 15–18 which form the friction zones 11, 13. This coolant originates from the converter and flows through the grooves 19 as a result of the pressure gradient between the interior chamber of the converter and the chamber 25. This oil which flows into the chamber 25 removes the heat generated by the slip on the one hand, but on the other hand it generates an undesirable counter pressure to the application pressure which acts on the piston. The resulting application force is thereby reduced, which would reduce the transmission capability of the clutch.

This effect can be counteracted by the friction zones 11, 13 in accordance with the present invention and illustrated in FIGS. 2 and 3. Each friction zone 11, 13 consists of two friction surfaces 15 and 16; 17 and 18, which are disposed radially next to one another. When the torque to be transmitted is low, a low application pressure is exerted, and only the friction linings 15, 17 with the greatest axial dimension and preferably a higher elasticity are in effective contact with the matching friction surface, as illustrated in FIG. 2. As the application pressure increases, the surface pressure increases, whereby the slip and the amount of heat released decrease. As a result, the axial dimension of the friction linings which are in effective contact can be adjusted as a function of the application pressure by an appropriate choice of the elasticity. If the pressure exerted by the converter is great enough that the friction linings 15, 17 in contact with the matching friction surface have this same axial dimension as the friction linings 16, 18, these friction linings 16, 18 also enter into effective contact, as illustrated in FIG. 3. The coupling increases as a result of the increase in the surface area in engagement and as a result of the higher pressure exerted by the higher surface pressure exerted by the converter.

Figure 7:
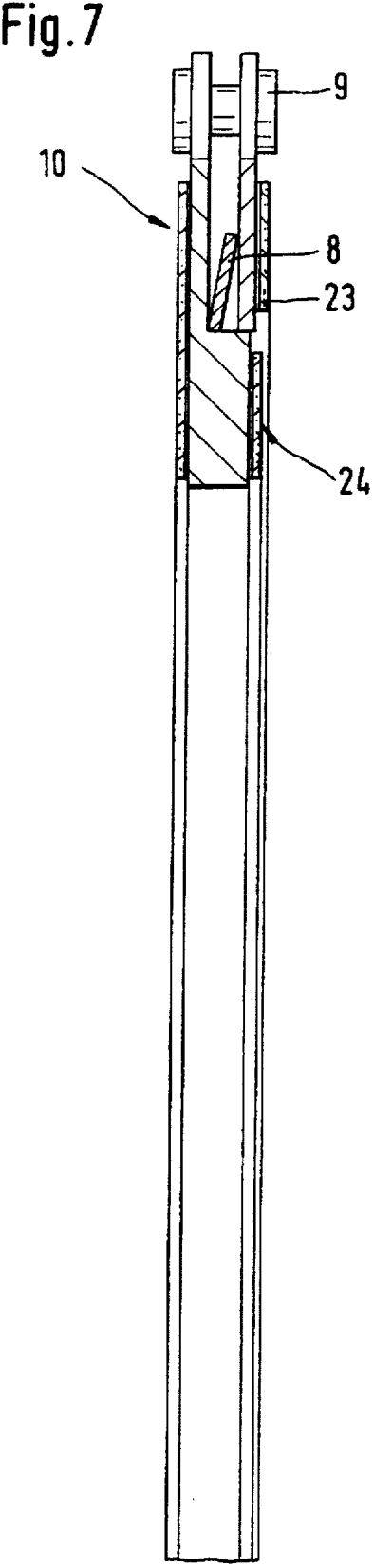
FIG. 7 is a section through a plate which is cushioned on one side in the vicinity of the outer friction lining, in the unpressurized operating condition.
Figure 8:
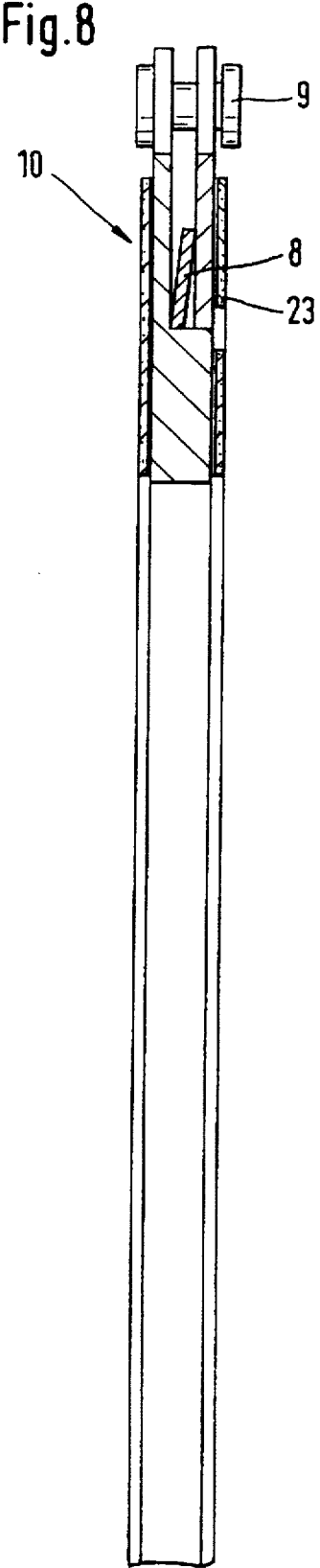
FIG. 8 is the same as FIG. 7, but in the pressurized operating condition.

The reduction of the axial dimension of the friction linings of the friction zones is accompanied by a reduction of the groove cross section, as a result of which the flow of coolant through the friction zones is reduced. A groove pattern which continues through into the second friction lining of a friction zone, as illustrated in FIG. 6, can also be employed to achieve a reduction of the coolant flow through this friction zone, as can a change in the direction of the groove, and smaller cross sections of the grooves. The greater axial dimension of the friction linings can also be achieved by attaching the friction linings to cushioned (or biased, e.g., spring biased) components. On a lock-up clutch of this type, the two friction linings 23 (shown in FIGS. 7–10) of a friction zone can also have the same elasticity. FIG. 7 illustrates a simple construction of a cushioning by means of an annular spring 8, which is in the unpressurized condition. In the pressurized condition, the surfaces of the friction linings of a friction zone are on the same level, as shown in FIG. 8. That is, there is no axial distance 24 between the radially disposed friction linings. The plate 10 can also be cushioned on both sides (for example by a pair of annular springs 8), as in the embodiment illustrated in FIGS. 9 and 10. To adjust the operating range of the spring 8 and to limit the maximum axial dimension, there is preferably provided a safety element 9. As the application pressure increases, the coolant flow can preferably be reduced, which can be achieved by several different means. It is possible that the grooves 19 in the elastic friction linings can be reduced or closed by the application pressure when the axial dimension is reduced. It is also possible that the friction surfaces which come into effective contact at higher pressures can have a smaller number of grooves 19.

FIG. 4 shows a friction lining of the friction surface 15, 17, which friction lining is located radially outward on the plate 10, and whereby the edge (or periphery) which is directed radially inward is realized in the shape of a polygon 21. The friction lining which forms the radially inner friction surface 16, 18 also has such a polygon-shaped edge (or periphery) 21, as shown in FIG. 5, on the radial outside, so that the two friction linings 15, 17 and 16, 18 can be connected positively, this positive or interlocking connection being illustrated by reference numeral 22. As shown in FIG. 6, the two friction linings are connected to one another so that the groove pattern extends over both friction linings 15, 17 and 16, 18.

The plate 10 illustrated in FIG. 11 has respective friction surfaces 115, 117 on both sides, whereby these friction linings have different elasticities. When the lock-up clutch is active, the two friction linings each come in contact with their corresponding matching friction surfaces. As the pressure exerted by the converter increases, the groove cross section in the friction lining with the greater elasticity is reduced, whereby the coolant flow can also be controlled by the pressure exerted by the converter.

While the present invention has been described by way of preferred embodiments wherein the frictional engagement zones 11 and 13 including the friction linings 15–18 are disposed on the surfaces of the clampable member or plate 10, it will be readily apparent to those of ordinary skill in the art that the friction linings could be alternatively disposed on the surfaces of the piston 7 and/or the torque converter housing 2. The friction linings need only be positioned within the clampable area located between the piston 7 and the torque converter housing 2, so that one of the friction linings is contacted initially as the piston 7 is displaced toward the torque converter housing 2 and another of the friction linings is contacted upon a further subsequent movement of the piston 7 toward the torque converter housing 2.

Additionally, while the present invention has been illustrated in lock-up clutch wherein a separate clampable member 10 is employed which is disposed between the piston 7 and the torque converter housing 2, those of ordinary skill in the art will appreciate that the present invention has equal applicability to torque converters having lock up clutches wherein a separate clampable member 10 is not utilized. For example, lock-up clutches in torque converters are known wherein the piston is rotationally connected to the turbine wheel and wherein an axial displacement of the piston brings it into contact with the rotationally driven torque converter housing. Friction linings disposed on either or both of the piston and the torque converter housing then act to transfer the torque from the torque converter housing, through the friction linings and the piston to the turbine wheel. The present invention can be employed in such lock-up clutches for torque converters of this type wherein the friction linings of the invention need only be positioned between the piston and the torque converter housing.

One feature of the invention resides broadly in the lock-up clutch of a hydrodynamic torque converter which comprises at least one piston which can be displaced in the axial direction and can be connected to the converter housing by means of at least one friction zone, which piston defines, by means of the side which faces the converter housing, a chamber in which, when the lock-up clutch is active, the pressure is lower than in the converter circuit, and which, in the vicinity of a friction zone, has at least one channel for the flow of hydraulic fluid from the converter circuit, whereby the quantitative flow of hydraulic fluid is a function of the pressure exerted by the converter, characterized by the fact that the lock-up clutch 1 comprises at least one friction zone 11, 13 which has at least one friction lining 15–18, whereby the lock-up clutch has a total of at least two friction linings of differential axial dimensions (or heights) which, in the event of different pressures acting in the converter, come into at least partial effective connection with the matching friction surface 14.

Another feature of the invention resides broadly in the lock-up clutch characterized by the fact that each friction zone 11, 13 consists of a plurality of friction linings 15, 16; 17, 18 which are located radially next to one another.

Yet another feature of the invention resides broadly in the lock-up clutch characterized by the fact that one of the friction zones 11, 13 consists of at least two friction linings 15–18 which are located axially one behind the other.

Still another feature of the invention resides broadly in the hydrodynamic torque converter characterized by the fact that the friction linings 15 and 16; 17 and 18 can be connected to one another.

A further feature of the invention resides broadly in the hydrodynamic torque converter characterized by the fact that the friction linings 15 and 16; 17 and 18 provided in one friction zone 11, 13 have different elasticities.

Another feature of the invention resides broadly in the hydrodynamic torque converter characterized by the fact that the friction lining 15, 17 which first enters into an effective connection with the matching friction surface 14 as a result of the pressurization of the piston has a high elasticity.

Yet another feature of the invention resides broadly in the hydrodynamic torque converter characterized by the fact that the friction lining 15–18, when pressurized by the application pressure, can be elastically deformed so that it becomes possible to control the coolant flow of the hydraulic fluid.

Still another feature of the invention resides broadly in the hydrodynamic torque converter characterized by the fact that the number of friction linings which are effectively connected to the matching friction surface can be increased by increasing the application pressure.

A further feature of the invention resides broadly in the hydrodynamic torque converter characterized by the fact that the friction linings 15 and 16; 17 and 18 of one friction zone 13, 11 can be connected positively.

Another feature of the invention resides broadly in the hydrodynamic torque converter characterized by the fact that at least one of the friction linings 15, 17 is located on a cushioned or (spring-mounted) component.

Yet another feature of the invention resides broadly in the hydrodynamic torque converter characterized by the fact that the surfaces of the friction linings run parallel to the corresponding matching friction surfaces.

Still another feature of the invention resides broadly in the hydrodynamic torque converter characterized by the fact that the path of the channels 19 of one friction lining 15 and 16; 17 and 18 continues into the neighboring friction lining of a friction zone.

A further feature of the invention resides broadly in the hydrodynamic torque converter characterized by the fact that the positively connected friction linings 15 and 16; 17 and 18 can be connected by means of a polygon.

Another feature of the invention resides broadly in the hydrodynamic torque converter characterized by the fact that the cushioned component is cushioned by means of an annular spring 8.

Yet another feature of the invention resides broadly in the hydrodynamic torque converter characterized by the fact that the maximum dimension of the cushioned component is limited by a safety element 9.

Still another feature of the invention resides broadly in the hydrodynamic torque converter characterized by the fact that the friction zone comprises at least two friction linings located radially next to one another, whereby preferably the friction lining which is located on the radial outside is cushioned.

A further feature of the invention resides broadly in the lock-up clutch characterized by the fact that the lock-up clutch 1 has at least two friction linings 115, 117 which have different elasticities.

Another feature of the invention resides broadly in the lock-up clutch characterized by the fact that when there is a sufficiently high pressure exerted by the converter, the friction linings 115, 117 enter into an effective connection, each with the respective matching friction surface corresponding to the friction lining, almost simultaneously.

Details of hydrodynamic torque converters are to be found in U.S. Patent application Ser. No. 08/527,760 filed on Sep. 13, 1995, and now U.S. Pat. No. 5,669,474, entitled "Hydrodynamic Torque Converter with Lock-Up Clutch" and having inventors Uwe Dehrmann, Peter Volland and Hans-Wilhelm Wienholt, as well as its corresponding foreign patent publication applications, namely Federal Republic of Germany Patent Application No. P 44 32 624.6, filed on Sep. 14, 1994 and having the same inventors, and DE-OS P 44 32 624.6 and DE-PS P 44 32 624.6, as well as their published equivalents, and other equivalents or corresponding applications, if any, in corresponding cases in the Federal Republic of Germany and elsewhere, each of the above-identified U.S. applications and foreign applications and foreign patent application publications being expressly incorporated by reference herein.

Further details relating to hydrodynamic torque converters are to be found in U.S. patent application Ser. No. 08/541,061 filed on Oct. 11, 1995 entitled "Hydrodynamic Torque Converter with Lockup Clutch" and having inventor Hans-Wilhelm Wienholt, as well as its corresponding foreign patent publication applications, namely Federal Republic of Germany Patent Application No. P 195 08 855.7, filed on Mar. 11, 1995 and having the same inventor, and DE-OS P 195 08 855.7 and DE-PS P 195 08 855.7, as well as their published equivalents, and other equivalents or corresponding applications, if any, in corresponding cases in the Federal Republic of Germany and elsewhere, each of the above-identified U.S. applications and foreign applications and foreign patent application publications being expressly incorporated by reference herein.

Some examples of torque converters employing lock up clutches are to be found in U.S. Pat. No. 4,138,003; U.S. Pat. No. 4,148,200; and U.S. Pat. No. 4,177,885, each of these issued U.S. patents being hereby expressly incorporated herein with the same effect as is fully set forth herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application Nos. 196 22 593.0, filed on Jun. 5, 1996 and 195 36 954.8, filed on Oct. 4, 1995, having inventor Uwe Dehrmann, and DE-OS 196 22 593.0 and 195 36 954.8 and DE-PS 196 22 593.0 and 195 36 954.8, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A hydrodynamic torque converter having a lock-up clutch, said hydrodynamic torque converter comprising:

a torque converter housing having an axis of rotation;

said torque converter housing being configured to receive an input torque and to be rotatingly driven about said axis of rotation;

a first hydraulic chamber disposed within said torque converter housing and containing a hydraulic fluid;

a pump wheel disposed within said first hydraulic chamber and connected to said torque converter housing;

a turbine wheel additionally disposed within said first hydraulic chamber and in opposition to said pump wheel; and a lock-up clutch for transferring at least some of said input torque from said torque converter housing to said turbine wheel, said lock-up clutch comprising:

a piston disposed within said torque converter housing and defining a second hydraulic chamber, said second hydraulic chamber being disposed between said piston and said torque converter housing;

said hydraulic fluid additionally being disposed within said second hydraulic chamber;

said piston being displaceable along said axis of rotation of said torque converter housing;

said piston having a first side facing said first hydraulic chamber, and said piston having a second side facing said second hydraulic chamber;

a clampable member disposed between said piston and said torque converter housing;

an arrangement to displace said piston along said axis of rotation to thereby clamp said clampable member between said piston and said torque converter housing;

the hydraulic pressure of said hydraulic fluid in said second chamber being substantially lower than the hydraulic pressure of said hydraulic fluid in said first chamber when said clampable member is clamped between said piston and said torque converter housing;

said clampable member comprising:

at least one flow channel for providing a flow of said hydraulic fluid between said first chamber and said second chamber;

said flow of said hydraulic fluid between said first chamber and said second chamber varying as a function of the clamping pressure exerted on said clampable member by said piston and said torque converter housing;

structure to frictionally engage with at least one of said piston and said torque converter housing, said frictional engagement structure comprising:

a first friction lining disposed on a surface of said clampable member;

said first friction lining extending a first axial distance from said clampable member and terminating in a first friction surface; and a second friction lining disposed on said surface of said clampable member;

said second friction lining extending a second axial distance from said clampable member and terminating in a second friction surface;

said second friction lining being distinct and separate from said first friction lining, and said second friction surface being distinct and separate from said first friction surface; and said first axial distance being substantially greater than said second axial distance to permit said flow of said hydraulic fluid between said first chamber and said second chamber to vary as a function of the clamping pressure exerted on said clampable member by said piston and said torque converter housing.

2. A hydrodynamic torque converter having a lock-up clutch, said hydrodynamic torque converter comprising:

a torque converter housing having an axis of rotation;

said torque converter housing being configured to receive an input torque and to be rotatingly driven about said axis of rotation;

first hydraulic chamber disposed within said torque converter housing and containing a hydraulic fluid;

a pump wheel disposed within said first hydraulic chamber and connected to said torque converter housing;

a turbine wheel additionally disposed within said first hydraulic chamber and in opposition to said pump wheel; and lock-up clutch for transferring at least some of said input torque from said torque converter housing to said turbine wheel, said lock-up clutch comprising:

a piston disposed within said torque converter housing and defining a second hydraulic chamber, said second hydraulic chamber being disposed between said piston and said torque converter housing;

said hydraulic fluid additionally being disposed within said second hydraulic chamber;

said piston being displaceable along said axis of rotation of said torque converter housing;

said piston having a first side facing said first hydraulic chamber, and said piston having a second side facing said second hydraulic chamber;

a clampable portion disposed between said piston and said torque converter housing;

an arrangement to displace said piston along said axis of rotation to thereby clamp said clampable portion between said piston and said torque converter housing;

at least one flow channel to provide a flow of said hydraulic fluid between said first chamber and said second chamber;

said clampable portion comprising:

a first friction lining comprising a first friction surface;

said first friction surface being disposed to frictionally engage first with a corresponding friction surface disposed on one of said piston and said torque converter housing; and a second friction lining comprising a second friction surface;

said second friction surface being disposed to frictionally engage with a corresponding friction surface disposed on one of said piston and said torque converter housing subsequent to the engagement of said first friction lining;

said first friction surface being disposed to frictionally engage with its corresponding friction surface upon an initial displacement of said piston toward said torque converter housing; and said second friction surface being disposed to frictionally engage with its corresponding friction surface upon a subsequent further displacement of said piston toward said torque converter housing; and at least one of said first friction surface and said second friction surface being disposed to permit the flow of said hydraulic fluid between said first chamber and said second chamber in said at least one flow channel to vary as a function of the clamping pressure exerted on said clampable portion by said piston and said torque converter housing.

3. The hydrodynamic torque converter according to claim 2, wherein said lock-up clutch comprises:

said first friction surface being disposed substantially parallel to said corresponding friction surface disposed on one of said piston and said torque converter housing; and said second friction surface being disposed substantially parallel to said corresponding friction surface disposed on one of said piston and said torque converter housing.

4. A hydrodynamic torque converter according to claim 3:

wherein one of said first friction lining and said second friction lining is disposed radially outward with respect to said axis of rotation from the other of said first friction lining and said second friction lining;

wherein said clampable portion comprises a clampable member disposed between said piston and said torque converter housing;

wherein said clampable portion is connected to said turbine wheel by a connection member connecting said clampable member with said turbine wheel;

wherein said first friction lining is disposed on a surface of said clampable member;

wherein said second friction lining is disposed on said surface of said clampable member; and said first friction surface being disposed substantially nearer to said one of said piston and said torque converter housing than said second friction surface.

5. A hydrodynamic torque converter according to claim 4:

wherein said clampable member further comprises a base member;

said base member being connected to said turbine wheel by said connection member;

said base member being rotatable about said axis of rotation with said turbine wheel;

each of said first friction lining and said second friction lining being disposed on said base member, and each of said first friction lining and said second friction lining having a thickness extending substantially parallel to said axis of rotation toward said one of said piston and said torque converter therefrom; and said thickness of said first friction lining being substantially greater than said thickness of said second friction lining.

6. A hydrodynamic torque converter according to claim 5:

wherein said first friction lining and said second friction lining are connected to one another.

7. A hydrodynamic torque converter according to claim 6:

wherein said first friction lining has a first elasticity;

wherein said second friction lining has a second elasticity; and wherein said first elasticity of said first friction lining is substantially different from said second elasticity of said second friction lining.

8. A hydrodynamic torque converter according to claim 7:

wherein said first elasticity of said first friction lining is substantially greater than said second elasticity of said second friction lining.

9. A hydrodynamic torque converter according to claim 8, wherein said lock-up clutch additionally comprises:

a portion of said at least one flow channel being disposed in substantial contact with at least one of said first friction lining and said second friction lining; and coolant flow reduction means for reducing the flow of said hydraulic fluid through said portion of said at least one flow channel disposed in substantial contact with said at least one of said first friction lining and said second friction lining.

10. A hydrodynamic torque converter according to claim 9:

wherein said coolant flow reduction means comprises:

said portion of said at least one flow channel disposed in substantial contact with at least one of said first friction lining and said second friction lining comprising a channel formed in said at least one of said first friction lining and said second friction lining; and said channel formed in said at least one of said first friction lining and said second friction lining being elastically deformable;

wherein said lock-up clutch additionally comprises:

means for contacting one of said first friction lining and said second friction lining with said one of said piston and said torque converter housing upon the application of a first contacting force between said clampable member and said one of said piston and said torque converter housing; and means for contacting both of said first friction lining and said second friction lining with said one of said piston and said torque converter housing upon the application of a second contacting force between said clampable member and said one of said piston and said torque converter housing;

said second contacting force being substantially greater than said first contacting force;

wherein said first friction lining and said second friction lining are provided with positively interlocking configurations;

wherein said positively interlocking configurations comprise:

a first polygonal configuration provided on a periphery of said first friction lining; and a second polygonal configuration provided on a periphery of said second friction lining;

said first polygonal configuration substantially matching and mating with said second polygonal configuration; and wherein said lock-up clutch additionally comprises:

a portion of said at least one flow channel being disposed in substantial contact with both of said first friction lining and said second friction lining;

said portion of said at least one flow channel disposed in substantial contact with both of said first friction lining and said second friction lining comprising a channel; and said channel flowing from one of said first friction lining and said second friction lining into the other of said first friction lining and said second friction lining.

11. A hydrodynamic torque converter according to claim 8, wherein said lock-up clutch additionally comprises:

a portion of said at least one flow channel being disposed in substantial contact with both of said first friction lining and said second friction lining;

said portion of said at least one flow channel disposed in substantial contact with both of said first friction lining and said second friction lining comprising a channel; and said channel flowing from one of said first friction lining and said second friction lining into the other of said first friction lining and said second friction lining.

12. A hydrodynamic torque converter according to claim 4, wherein said clampable member additionally comprises;

biasing means for exerting a biasing force on said first friction surface in a direction toward said one of said piston and said torque converter housing;

said first friction surface being movable in a direction away from said one of said piston and said torque converter housing against said biasing force exerted by said biasing means.

13. A hydrodynamic torque converter according to claim 12:

wherein said said biasing means comprises an annular spring member.

14. A hydrodynamic torque converter according to claim 13, wherein said said clampable member additionally comprises:

limiting means for limiting the movement of said first friction surface in said direction toward said one of said piston and said torque converter housing due to said biasing force exerted by said biasing means.

15. A hydrodynamic torque converter according to claim 14:

wherein said one of said first friction lining and said second friction lining being disposed radially outward with respect to said axis of rotation is said first friction lining.

16. A hydrodynamic torque converter according to claim 5:

wherein said clampable portion comprises means for frictionally engaging with both of said piston and said torque converter housing;

wherein said first friction lining and said second friction lining are disposed on a first side of said base member;

said base member having a second side opposite to said first side; and wherein said clampable portion additionally comprises at least an additional friction lining disposed on said second side of said base member;

said additional friction lining having a substantially different elasticity from the elasticity of at least one of said first friction lining and said second friction lining.

17. A hydrodynamic torque converter according to claim 16:

wherein, when said clampable member is clamped between said piston and said torque converter housing, said additional friction lining engages one of said piston and said torque converter housing and at least one of said first friction lining and said second friction lining engages the other of said piston and said torque converter housing substantially simultaneously.

18. A hydrodynamic torque converter according to claim 6, wherein said first friction lining and said second friction lining are provided with positively interlocking configurations.

19. A hydrodynamic torque converter according to claim 18, wherein said positively interlocking configurations comprise:

a first polygonal configuration provided on a periphery of said first friction lining; and a second polygonal configuration provided on a periphery of said second friction lining;

said first polygonal configuration substantially matching and mating with said second polygonal configuration.

20. A hydrodynamic torque converter according to claim 2, wherein said lock-up clutch additionally comprises:

means for contacting one of said first friction lining and said second friction lining with said one of said piston and said torque converter housing upon the application of a first contacting force between said clampable portion and said one of said piston and said torque converter housing;

means for contacting both of said first friction lining and said second friction lining with said one of said piston and said torque converter housing upon the application of a second contacting force between said clampable portion and said one of said piston and said torque converter housing; and said second contacting force being substantially greater than said first contacting force.

21. A hydrodynamic torque converter according to claim 2:

wherein said one of said piston and said torque converter housing comprises a frictional engagement surface;

wherein said first friction surface is aligned substantially parallel with said engagement surface of said one of said piston and said torque converter housing; and wherein said second friction surface is aligned substantially parallel with said engagement surface of said one of said piston and said torque converter housing.

22. A hydrodynamic torque converter having a lock-up clutch, said hydrodynamic torque converter comprising:

a torque converter housing having an axis of rotation;

said torque converter housing being configured to receive an input torque and to be rotatingly driven about said axis of rotation;

a first hydraulic chamber disposed within said torque converter housing and containing a hydraulic fluid;

pump wheel disposed within said first hydraulic chamber and connected to said torque converter housing;

a turbine wheel additionally disposed within said first hydraulic chamber and in opposition to said pump wheel; and a lock-up clutch for transferring at least some of said input torque from said torque converter housing to said turbine wheel, said lock-up clutch comprising:

a piston disposed within said torque converter housing and defining a second hydraulic chamber, said second hydraulic chamber being disposed between said piston and said torque converter housing;

said hydraulic fluid additionally being disposed within said second hydraulic chamber;

said piston being displaceable along said axis of rotation of said torque converter housing;

said piston having a first side facing said first hydraulic chamber, and said piston having a second side facing said second hydraulic chamber;

a clampable member disposed between said piston and said torque converter housing;

an arrangement to displace said piston along said axis of rotation to thereby clamp said clampable member between said piston and said torque converter housing;

said clampable member comprising:

structure to frictionally engage with at least one of said piston and said torque converter housing;

said frictional engagement structure comprising:

a first friction lining;

said first friction lining having a first elasticity; and a second friction lining;

said second friction lining having a second elasticity;

said first elasticity being substantially different than said second elasticity;

at least one of said first friction lining and said second friction lining comprising at least one flow channel for providing a flow of said hydraulic fluid between said first chamber and said second chamber; and said at least one flow channel being elastically deformable as a function of the clamping pressure exerted on said clampable member by said piston and said torque converter housing to permit greater initial flow of said hydraulic fluid between said first chamber and said second chamber upon application of a first clamping pressure on said clampable member, and a lesser flow of said hydraulic fluid upon an increase in the clamping pressure on said clampable member.

23. The hydrodynamic torque converter according to claim 22, wherein:

said first friction lining has a first friction surface facing a corresponding friction surface disposed on one of said piston and said torque converter housing;

said first friction surface is disposed a first axial distance from its corresponding friction surface disposed on said one of said piston and said torque converter housing;

said second friction lining has a second friction surface facing a corresponding friction surface disposed on one of said piston and said torque converter housing;

said second friction surface is disposed a second axial distance from its corresponding friction surface on said one of said piston and said torque converter housing; and said first axial distance is substantially different than said second axial distance.

24. The hydrodynamic torque converter according to claim 23, wherein said lock-up clutch comprises:

an arrangement to contact one of said first friction surface and said second friction surface with its corresponding friction surface on said one of said piston and said torque converter housing upon the application of a first contacting force between said clampable member and said one of said piston and said torque converter housing;

an arrangement to substantially simultaneously contact both of said first friction surface and said second friction surface with their corresponding friction surface on said one of said piston and said torque converter housing upon the application of a second contacting force between said clampable member and said one of said piston and said torque converter housing; and said second contacting force being substantially greater than said first contacting force.

* * * * *

UNITED STATES PATENT AND TRADEMARK OFFICE
CERTIFICATE OF CORRECTION

PATENT NO. :  5,799,763
DATED      :  September 1, 1998
INVENTOR(S) : Uwe DEHRMANN It is certified that error appears in the above-identified patent and that said Letters Patent is hereby corrected as shown below:

In column 11, line 23, Claim 2, before 'lock-up' insert --a--.

In column 15, line 41, Claim 22, before 'pump' insert --a--.

Signed and Sealed this

Twenty-third Day of February, 1999

Attest:

Q. TODD DICKINSON

*Attesting Officer*    *Acting Commissioner of Patents and Trademarks*